United States Patent [19]
Dingsor

[11] Patent Number: 5,742,641
[45] Date of Patent: Apr. 21, 1998

[54] APPARATUS, METHOD AND ARTICLE OF MANUFACTURE FOR THE DYNAMIC COMPENSATION OF FM DEVIATION IN A FM RADIO RECEIVER

[75] Inventor: Andrew Dwight Dingsor, Durham, N.C.

[73] Assignee: International Business Machines Corporation, Armonk, N.Y.

[21] Appl. No.: 683,478

[22] Filed: Jul. 18, 1996

[51] Int. Cl.⁶ .............................. H04B 1/38; H04L 5/16
[52] U.S. Cl. .................. 375/222; 455/557; 455/75
[58] Field of Search .................... 375/222; 329/315, 329/123; 455/557, 558, 75

[56] References Cited

U.S. PATENT DOCUMENTS

| | | | |
|---|---|---|---|
| 3,810,188 | 5/1974 | Gross et al. | 346/33 |
| 4,087,756 | 5/1978 | Rogers, Jr. | 329/50 |
| 4,293,818 | 10/1981 | Jarger | 329/50 |
| 4,355,414 | 10/1982 | Inoue | 455/184 |
| 4,466,128 | 8/1984 | Couvillon | 455/208 |
| 4,484,154 | 11/1984 | Pavin | 331/23 |
| 4,523,324 | 6/1985 | Marshall | 375/91 |
| 4,573,026 | 2/1986 | Curtis et al. | 332/18 |
| 4,870,699 | 9/1989 | Garner et al. | 455/76 |
| 4,905,305 | 2/1990 | Garner et al. | 455/183 |
| 5,034,695 | 7/1991 | Owen | 329/325 |
| 5,280,644 | 1/1994 | Vannatta et al. | 455/265 |
| 5,301,364 | 4/1994 | Arens et al. | 455/69 |
| 5,365,546 | 11/1994 | Koenck et al. | 375/9 |
| 5,396,251 | 3/1995 | Schuermann | 342/51 |
| 5,408,695 | 4/1995 | Dorr | 455/226.1 |
| 5,438,699 | 8/1995 | Coveley | 455/67.4 |
| 5,453,748 | 9/1995 | Lindell | 342/51 |
| 5,493,710 | 2/1996 | Takahara et al. | 455/192.2 |
| 5,497,402 | 3/1996 | Pyo et al. | 375/344 |
| 5,517,491 | 5/1996 | Nanni et al. | 370/29 |

Primary Examiner—Stephen Chin
Assistant Examiner—Mohammad Ghayour
Attorney, Agent, or Firm—John D. Flynn

[57] ABSTRACT

Described is a method, apparatus, and article of manufacture to minimize radio data modem receive errors when a base station keys up. It applies to an intermittently keyed, multiple base station, single frequency reuse, FM modulated, radio data network such as the ARDIS network. Compensation is provided for the fact that each base station in the network may have a different transmit FM deviation level. Since these networks typically use the same base station to transmit to any one radio data modem over periods of time, and since the modem receiver can measure and remember the FM deviation level of each base station, a modem can compensate by using the FM deviation value of its "present" base station as the starting value for its automatic deviation control algorithm. By seeding the algorithm with the actual value for the "present" base station, receive data errors are reduced during the critical time when the base station is keying up. As the geographical position of the modem changes, or as radio conditions vary, the network may select a different base station to transmit to a modem. The modem will detect this change, and dynamically change its compensation to match the new "present" base station.

19 Claims, 10 Drawing Sheets

| BASE STATION ID | FM DEVIATION FACTOR |
|---|---|
| C547621F1 | 1.2369 |
| A13579BD709 | 1.1059 |
| B56437CE51 | 1.0371 |
| A2467D3201 | 0.9876 |

FIG. 10

APPARATUS, METHOD AND ARTICLE OF MANUFACTURE FOR THE DYNAMIC COMPENSATION OF FM DEVIATION IN A FM RADIO RECEIVER

BACKGROUND OF THE INVENTION

1. Field of the Invention

The present invention is related to digitally controlled radio communications devices and more particularly, to FM deviation control in a FM radio receiver.

2. Description of the Prior Art

In an intermittently keyed single frequency reuse radio data network, multiple base stations transmit data to multiple radio data modems at different times on the same radio frequency. Each radio data modem can listen for transmissions from multiple base stations. To communicate with each radio data modem, the network controller selects the base station with the "best" signal path to the particular modem. Single frequency reuse networks like ARDIS use frequency modulation to convey messages to modems.

Frequency modulation (FM) changes the carrier frequency, or an intermediate frequency if channels are multiplexed, in proportion to the instantaneous average value of a baseband signal. With FM the carrier frequency is modulated with the baseband signal. In the ARDIS network, associated with each base station transmitter are errors or drifts in the FM deviation level. These drifts or errors are caused by components changing over time. The transmitter components are tuned periodically but, can drift or change between tunings. The deviation level may increase the modulation voltage range (i.e., amplify the modulation voltage) or decrease the modulation voltage range (i.e., attenuate the modulation voltage). FM deviation causes the modulating signal to be amplified outside a specified range or attenuated within a specified range. Thus, FM deviation is caused by changes in the range or magnitude (i.e., $V_{MAX}$ to $V_{MIN}$) of the modulating signal of the transmitter. In an FM system this causes the transmitted FM signal to occupy more bandwidth (i.e., the carrier frequency is varied over a wider bandwidth due to larger voltage range of modulating signal) or less bandwidth (i.e., the carrier frequency is varied over a smaller bandwidth due to smaller voltage range of the modulating signal).

In FM receivers, the FM deviation error of the transmitter is manifested as an error in the amplitude level of the demodulated baseband signal. This amplitude deviation is due to the transmitted FM signal occupying a bandwidth that is larger or smaller than that allocated to the transmitter. FM deviation causes a change in the amplitude of the demodulated baseband signal which if uncompensated can cause errors, loss of data error margin, higher bit error rates which results in more data frames being transmitted in error, more re-tries, and slower perceived throughput for the user of the radio-data modem. This loss of error margin is particularly significant in 4-level data encoding systems like RD-LAP. RD-LAP uses four level symbols and associated levels are commonly referred to as +3, +1, −1, −3. Because the symbols are level sensitive, changes in the received baseband voltage range can cause errors in the symbol recovery and thus in resulting data. In a four-level system such as RD-LAP the distance between adjacent symbol levels is one-third of the total range from maximum to minimum levels (+3 to −3). A receiver can receive these levels without ambiguity when the received symbol falls within half the inter-level distance, or only one-sixth the total range. As error in the transmitted signal deviation increases, reception by the modem becomes more and more difficult.

FM deviation is particular a problem in intermittently keyed single frequency reuse networks where multiple base stations time multiplex the same frequency spectrum. Each base station transmitter may have a different FM deviation level. Because a receiver in the network must be capable of receiving message from any base stations it must be capable of handling a wide variety of FM deviation levels. This problem is unique to intermittently keyed single frequency reuse networks, like ARDIS. Using multiple base stations on the same frequency helps provide the benefit of increased "building penetration" since the modem has a better chance of receiving one of multiple base stations. However, the modem must be able to adapt to the characteristics of each of these base stations. This problem is not present in other network architectures, where base stations are continuously keyed and only one base station transmits on that frequency (in each geographical area). In those networks, the modem receives from only one base station over long periods of time.

This problem has traditionally been reduced by implementing a type of automatic gain control in the receiver. These techniques analyze the content of a received signal over a significant period of time, and then adjust the receiver to compensate. These techniques work well for continuously keyed networks where the receiver hears one base station over long periods of time. However, these techniques do not eliminate the problem completely in intermittently keyed networks because during data at the beginning of a transmitter key-up can be received in error or not at all, while the AGC is attempting to lock or settle onto the desired amplification or attenuation level. In an intermittently keyed network, base stations key up only to send information frames, and these are the first frames sent when the base station keys up. Thus, the important initial data frames are lost resulting in less data throughput.

These unresolved problems and deficiencies are clearly felt in the art and are solved by the invention in the manner described below.

SUMMARY OF THE INVENTION

The above-mentioned needs have been met in accordance with the present invention by providing for a method, apparatus and article of manufacture that satisfies these needs. Accordingly, it is an object of the present invention to provide FM data communications that are less error prone.

It is a further object of the present invention to provide FM data communications that reduces the number of transmission retries.

It is an object of the present invention to provide FM data communications with higher throughput.

It is a further object of the present invention to provide FM data communications with a minimum impact on the communications time line.

It is yet another object of the present invention to provide dynamic compensation wherein a receiver maintains a table of deviation levels for base stations from which it can listen.

It is yet another object of the present invention to provide compensation for FM deviation with less dependency on an automatic gain control mechanism such that data at the beginning of a transmission from a base station is received with fewer errors.

It is yet another object of the present invention to provide compensation for FM deviation with less dependency on expensive radio components.

It is yet another object of the present invention to provide compensation for FM deviation where the compensation can be changed and updated easily.

Briefly described the present invention provides a method, apparatus, and article of manufacture to minimize radio data modem receive errors when a base station keys up. A modem used with an intermittently keyed, multiple base station, single frequency reuse, FM modulated, radio data network such as the ARDIS network is provided with compensation for the fact that each base station in the network may have a different transmit FM deviation level. Since these networks typically use the same base station to transmit to any one radio data modem over periods of time, and since the modem can measure and remember the FM deviation level of each base station, a modem can compensate by using the FM deviation value of its "present" base station as the starting value for its automatic deviation control algorithm. By seeding the algorithm with the actual value for the "present" base station, receive data errors are reduced during the critical time when the base station is keying up. As the geographical position of the modem changes, or as radio conditions vary, the network may select a different base station to transmit to a modem. The modem will detect this change, and dynamically change its compensation to match the new "present" base station.

BRIEF DESCRIPTION OF THE DRAWINGS

The foregoing and other objects, aspects and advantages of the invention will be better understood from the following detailed description with reference to the drawings, in which:

FIG. 10 is a sample FM deviation table.

DETAILED DESCRIPTION

Figure 1:
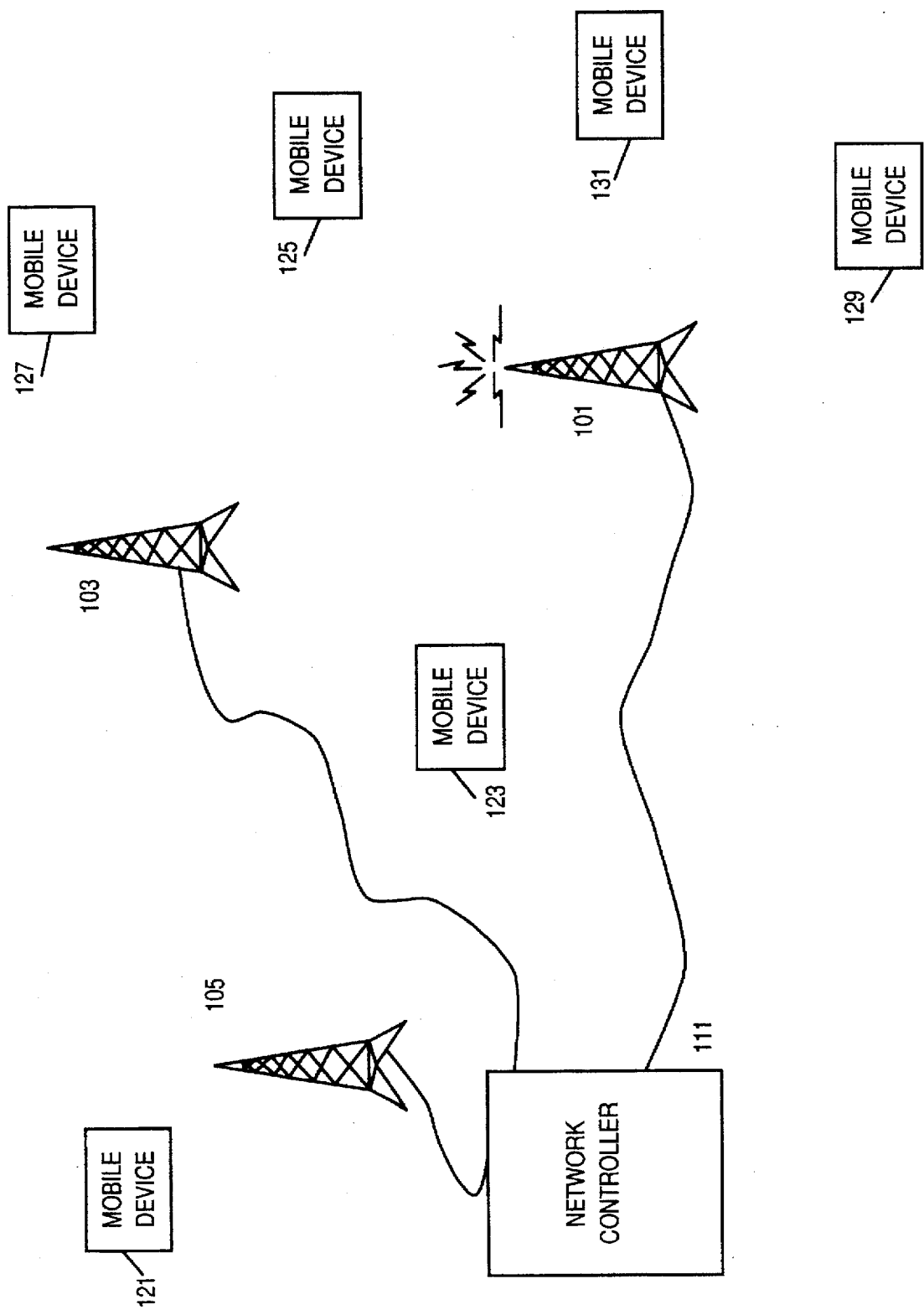
FIG. 1 depicts an architecture of a single frequency reuse radio data network.

An overview of a single frequency reuse network such as ARDIS is shown in FIG. 1. Note base stations 101, 103 and 105 are coupled by land lines to a network controller 111. Several mobile users are depicted in the area shown as 121, 123, 125, 127, 129 and 131. All these mobile users are locked onto the single frequency used in the network. Frequency-agile mobile devices have scanned to find the network, and fixed frequency devices are programmed there permanently. Throughout the business day, the mobile users stay locked on this same frequency. Although the throughput requirements in some large cities may require the network to operate additional network "layers" on additional frequencies, the mobile users will typically operate on the same frequency for long periods of time (days/months).

The network controller chooses the best base station to transmit to each mobile user, and keys up that base station when it has a data message for a particular mobile user. When the network controller has a data message to be transmitted to another mobile user, if the presently keyed up base station is also serving that mobile user, it will keep that base station keyed up and enqueue the message for transmission by that base station. However, if another base station is serving the other mobile user, the network controller will key down the present base station (when the first message is completed) and then key up the correct base station to transmit the message.

Mobile users in a "good" coverage area are able to receive signals from several of the base stations. For example, in FIG. 1, mobile user 125 might hear base stations 101 and 103, but not 105. Since in practice, the base stations are keyed on and off rapidly (within seconds), with one or two information messages being sent to users per key up, mobile user 125 might hear transmissions from base station 101, followed by silence while 105 is transmitting, and then would hear from 101 again, and then from 103.

Figure 2:
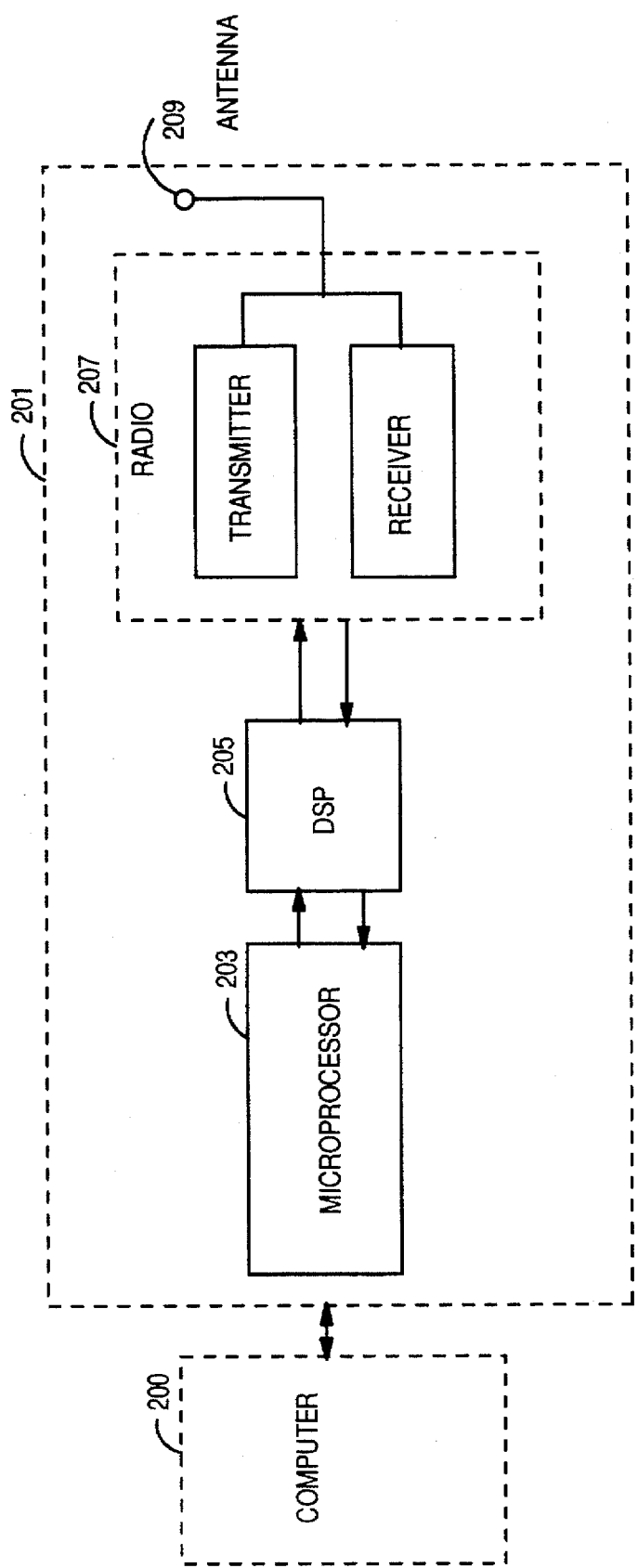
FIG. 2 depicts an overview of an FM radio modem.

An overview of a mobile device is shown in FIG. 2. FIG. 2 depicts a host device 200 and wireless modem 201. A wireless modem 201 is similar to a wired modem in that it permits a computer or other device to send and receive data from external sources. The host device 200 can be a computer such as a laptop, palm top, personal digital assistant (PDA), PC, mainframe, base station, switch, pager or other processing device. The wireless modem 201 may be installed as an adapter card or slot such as a PCMCIA slot or may be packaged in a standalone housing or fully integrated into the host device.

The present invention provides FM deviation compensation to a FM signal used in wireless communication. The FM deviation compensation is applied when the radio modem is receiving FM signals from an FM transmitter. The present invention may be used with any FM radio system including but not limited too the following: Radio Data Link Access Protocol (RDLAP) and Motorola Data Communication (MDC).

In the preferred embodiment, the radio modem consists of three major components: a microprocessor 203, a digital signal processor (DSP) 205 and radio 207 including an antenna. The microprocessor 203 including memory (i.e., in the preferred embodiment static random access memory RAM (SRAM) and/or flash memory and/or DRAM) and associated circuitry is responsible for interfacing with the host computer 200 or other device wishing to send and receive data. It may provide other functions such as buffering; modem management functions; DSP configuration and booting or startup; and radio configuration and booting or start up; and Messaging and protocol management. The microprocessor may also control channel and frequency assignment and control of the frequency synthesizer or frequency generator that makes use of the crystal to provide signals at frequencies necessary for modulation and demodulation of RF signals. The microprocessor may also provide additional layers of protocol stack, such as the RD-LAP Service Sublayer. The microprocessor interface permits the modem to receive data and commands from the host device and provide data and status information to the host device. The three major components may all be embodied only in a single semiconductor device.

The DSP 205 may provide transmit functions including encoding of signals that are transmitted. The DSP 205 provides receive functions including decoding and FM deviation compensation to signals that are received. In the preferred embodiment the DSP 205 provides processing for FM deviation compensation for received signals. The DSP 205 functions are discussed in detail below.

In the preferred embodiment the radio 207 consists of a transmitter for modulating signals and a receiver for demodulating signals. The transmitter and receiver may share a common antenna 209 via a duplexer. The transmitter is responsible for generating an FM signal at a carrier frequency using a baseband signal and a local oscillator signal (i.e., modulating the carrier frequency in accordance with the baseband signal). The receiver is responsible for producing a baseband signal from an FM signal using a local oscillator signal (i.e., demodulating the FM signal using the changing carrier frequency to provide the baseband signal). The radio 207 or communications circuitry provides physical access to a network or connection (i.e., the wireless or ARDIS network of the preferred embodiment). The radio 207, as is common among wireless modems, may have its own battery. An antenna is used for transmitting and receiving the electromagnetic communications signals from the air interface.

Figure 5:
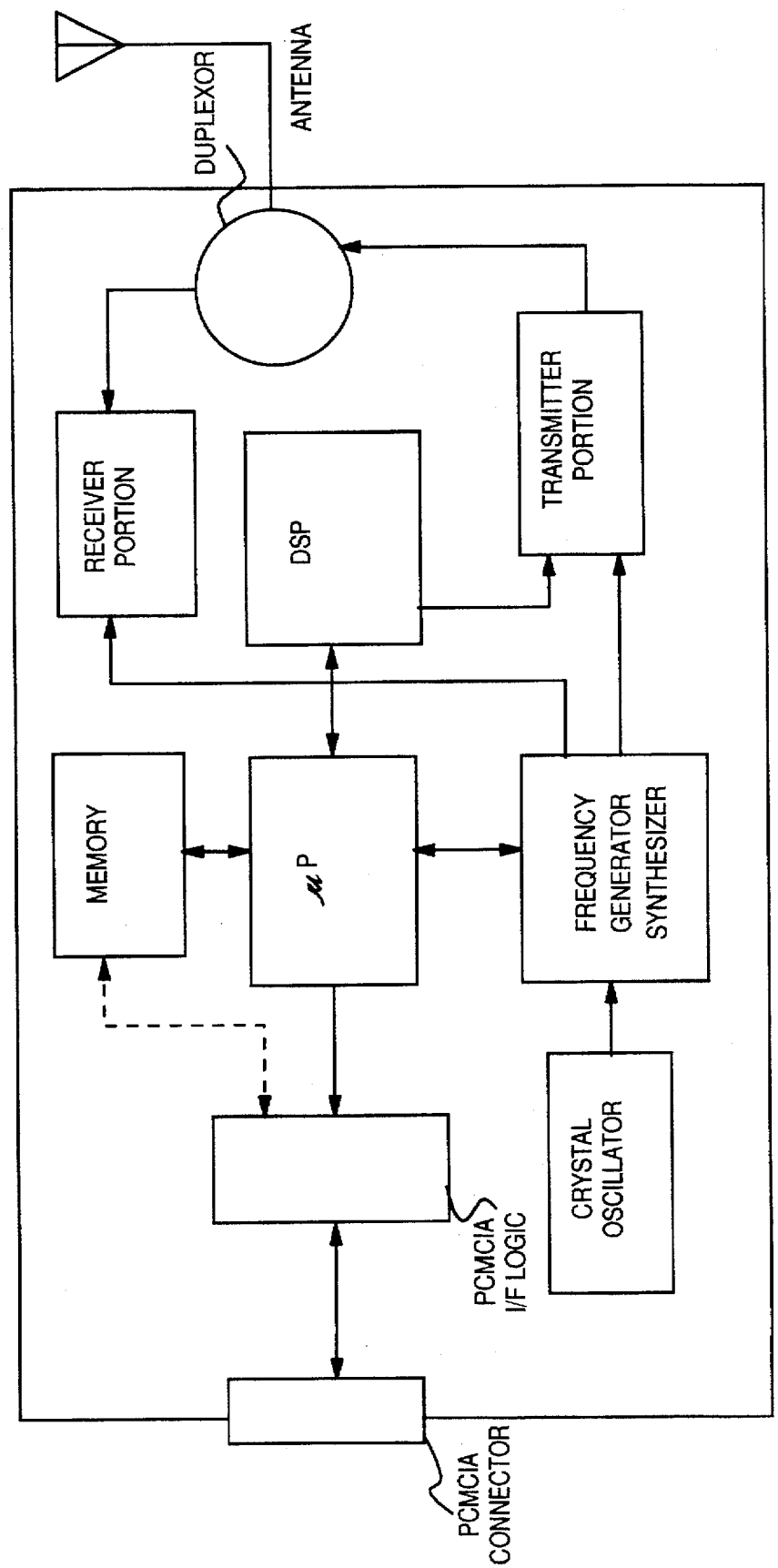
FIG. 5 depicts an PCMCIA FM radio modem.

In the preferred embodiment the radio modem fits into a PCMCIA slot of a host device. Thus, the wireless modem comprises a PCMCIA connector and PCMCIA interface logic for providing the modem with an external interface. This is depicted in FIG. 5. Note that various components of the modem may be located eternally from the PCMCIA card (i.e., the battery, antenna, radio). Note that in both the Receiver and Transmitter a local oscillator signal at a designated frequency is shown. Note however that a single crystal may be utilized to produce the local oscillator signal for multiple frequencies and channels. As shown in FIG. 5 a programmable frequency synthesizer may also be utilized in the modem for providing a plurality of frequencies so that multiple channels and full duplex operation are supported. The modem may also provide support for a plurality of protocols including those used in ARDIS. Also note that although the present invention is depicted with only a single receive/transmit stages, multiple stages can be used, as is common for instance in super-heterodyne receivers. Thus, IF stages and filters and amplifiers are not shown or discussed. All or any subset of the above functions can be provided in a single semiconductor device.

Figure 7:
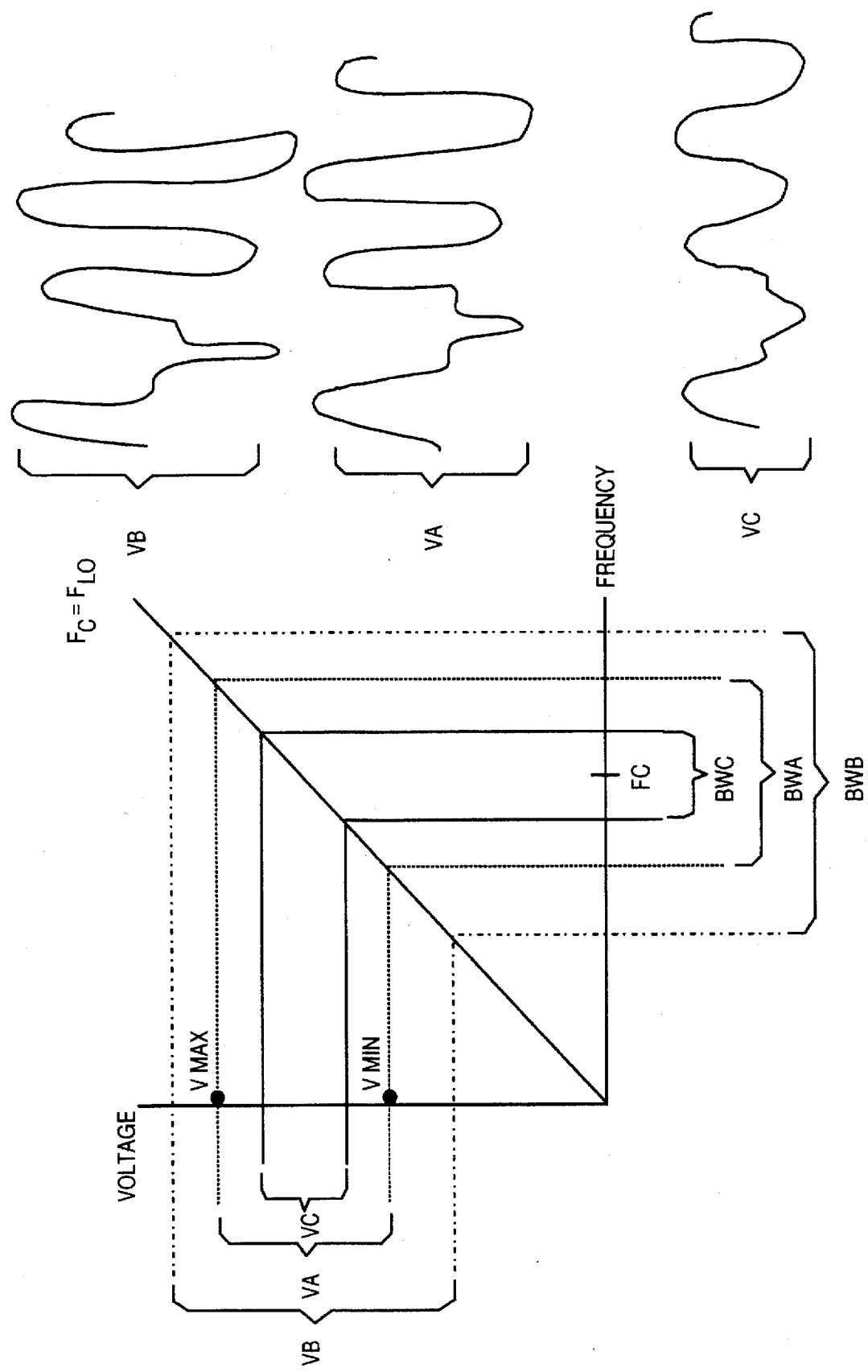
FIG. 7 depicts the relationship between FM deviation and bandwidth utilization.

FIG. 7 depicts FM deviation level in a transmitter. As shown in FIG. 7, the desired or expected FM modulation level or modulation range is $V_A$. In the preferred embodiment, $V_A$ is an encoded base band analog signal that represents digital information to be transmitted. $V_A$ is used to frequency modulate the carrier frequency of a transmitted signal. Thus, as $V_A$ changes so does the carrier frequency of the transmitted signal. $V_A$ is the voltage range expected by the transmitter. The transmitter expects a base band signal that varies in amplitude between $V_{MAX}$ and $V_{MIN}$ in accordance with digital information encoded into the base band signal. If the encoder is tuned properly then the FM deviation level is $V_A$ and the transmitted signal occupies a bandwidth $BW_A$. At a receiver, $V_A$ is recovered, as modified by noise and interference during transmission, by demodulating the received FM modulated signal. The receiver then decodes $V_A$ to obtain the digital data stream.

However, if the transmitter or encoder components drift or vary over time or are mal-adjusted then the analog base band signal can be amplified as shown by $V_B$ or attenuated as shown by $V_C$. Accordingly, the FM signal transmitted occupies frequency bandwidth $BW_B$ or $BW_C$, respectively. In the receiver the amplified analog baseband voltage $V_B$ 5or the attenuated baseband voltage $V_C$ is recovered. Without compensation, the scaling of the demodulated baseband signal can cause errors in the decoded digital data stream. Automatic Gain Control (AGC) circuitry can scale (amplify or attenuate) the baseband signal by continuously monitoring the baseband voltage levels and adjusting a gain accordingly. However, automatic gain control circuitry when implemented in the radio portion makes changes, improvements and updates difficult and expensive, while adding to the cost of the radio portion of the wireless modem. Also AGC circuitry requires tracking and measurement over a relatively long period of time before the appropriate gain is determined. Thus, data received from an intermittently keyed single frequency reuse network while the AGC is attempting to determine an appropriate gain can be lost or error prone resulting in more retries and retransmission which degrade the effective bandwidth of the RF channel.

The right hand side of FIG. 7 depicts sample voltage ranges representing the same digital information. Note that ranges correspond to $V_A$, $V_B$ and $V_C$.

FM Deviation Compensation for Received Signals

In an intermittently keyed single frequency reuse network each modem is capable of hearing all messages from base stations radiating in a given geographical vicinity. The network controller is able to determine the best base station for communication with a particular modem in the network. Each base station in the network is assigned a unique identifier. In RD-LAP and MDC networks this ID consists of a country code, network ID, subnetwork ID, and base station ID. Each base station transmits its identifier whenever it transmits a data message, either immediately preceding the data message, or immediately following it. Each modem hears the base station IDs and correlates the messages it has received with the ID of the base station which sent it. The modem therefore knows which base station has been chosen by the network controller to send it messages, and which base station is most likely to send it future messages. Since the base station from which the modem is to receive future messages is known and since the modem can hear messages from other base stations the modem can dynamically maintain a table of FM deviation factors that can be used by the wireless modem and applied when that particular base station becomes the most likely base station from which the wireless modem will receive messages.

Figure 3:
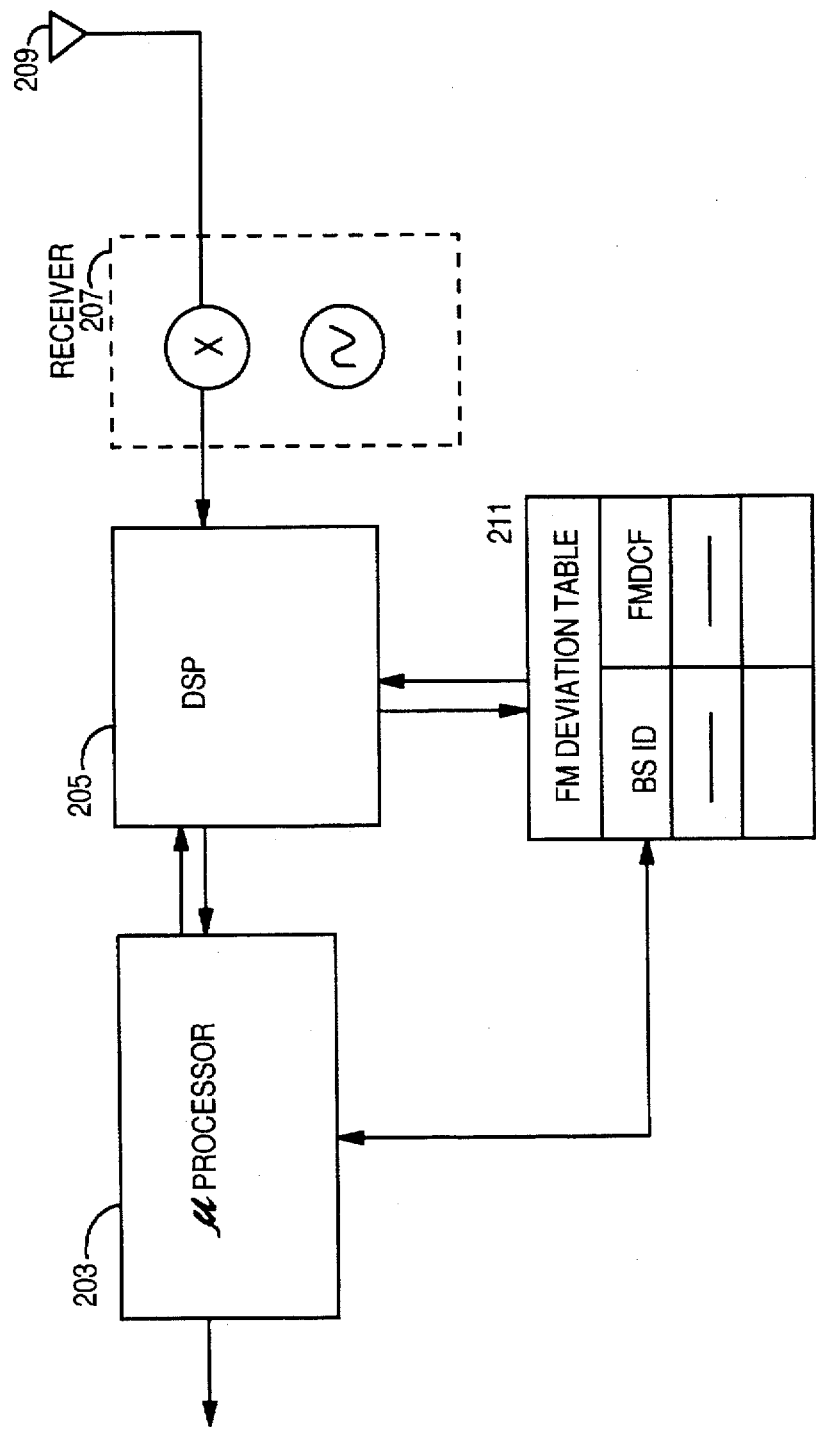
FIG. 3 depicts reception of FM signal providing for FM deviation compensation

FIG. 3 illustrates the signal path for the reception of FM signals. Messages in the form of FM signals are radiated by base stations in the ARDIS network. The wireless modem thus receives a stream of messages represented by FM signals. An FM signal is received from an antenna 209 and the received FM signal is provided to receiver 207. The receiver 207 takes the FM signal mixes it with a local oscillator signal to produce an analog baseband signal. This baseband signal is then processed by the DSP 205 to produce a digital data stream that the microprocessor 203 provides to the host device. Note that other techniques may be utilized to produce the analog baseband signal from the received FM modulated signal. Thus, multiple mixer stages may be used with intermediate frequency (IF) processing that can produce one or more baseband signals. The IF stage and amplifiers and filters are omitted for clarity.

In the preferred embodiment, the DSP performs FM deviation compensation. The pipelined nature of a DSP makes it ideally suited for FM deviation control functions and for decoding functions associated with wireless modem operations. The DSP 205 makes use of a FM deviation table 211 which is created dynamically. The DSP 205 may access the FM deviation table 211 directly or indirectly via the microprocessor 203. The DSP 205 contains an FM deviation compensation (FMDC) function which applies a FM deviation compensation factor (FMDCF) to each sample of the digitized analog baseband signal. The FMDC uses a default or starting or seed FMDCF and then adjusts the FMDCF in accordance with a control algorithm. The starting FMDCF is usually associated with the base station identifier of the base station that messages are expected to be received from. Thus, after each message with the base identifier extracted from the message, the adjusted FMDCF is stored in the FM Deviation Factor (FMDF) table with the extracted base station identifier. In the event that a message is received from other than the expected base station then the FMDCF is reset to a value obtained from the FMDF table associated with the expected base station.

Figure 4:
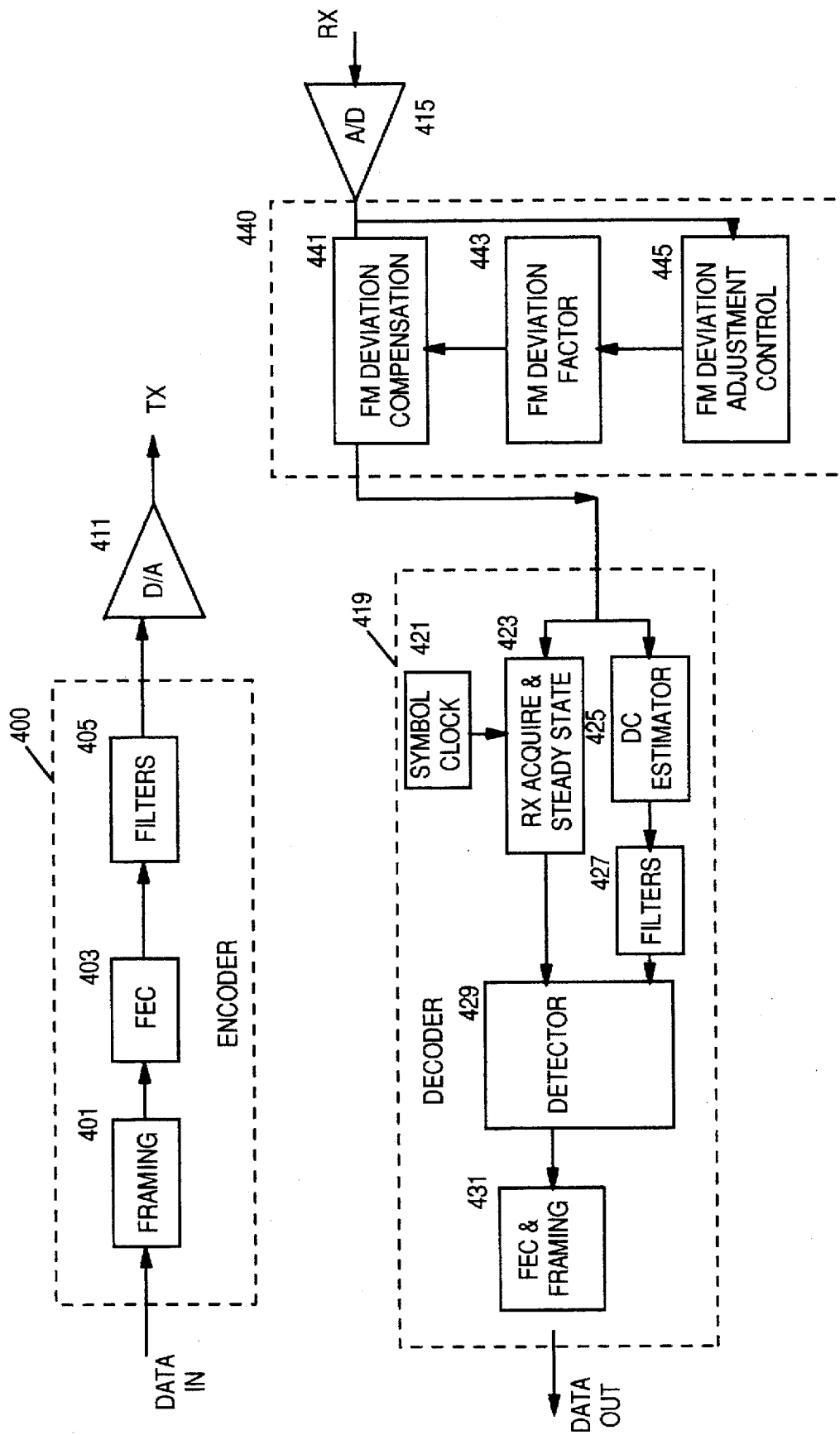
FIG. 4 depicts a more detailed look at the digital signal processing in a generic DSP having FM deviation compensation

FIG. 4 depicts DSP functions for transmitting and receiving FM signals. As shown in FIG. 4, the received analog baseband signal is converted to digital samples by A/D converter 415. Note that each sample represents a voltage level (e.g., positive and/or negative voltage levels) of the received baseband signal at a certain point in time. The digital samples, which may be any bit length but, are typically 8 or 16 bits may be represented in any binary form (i.e., short real, long real, floating point, integer, one's complement, two complement etc.). In the preferred embodiment a 2's complement form is used. The FM deviation control 440 applies FM deviation compensation to each sample in FM deviation compensation (FMDC) function 441 using the FMDCF 443. The FM deviation control 440 also provides for dynamic tracking of the FM deviation level and for adjusting the FMDCF 443 as it tracks or monitors the sample stream as shown in FM Deviation Adjustment Control (FMDAC) function 445.

Each sample is provided to the FM deviation compensation (FMDC) function 441. The FMDC applies the FM Deviation Compensation Factor (FMDCF) 443 to each sample. Each sample is scaled by the FMDCF to produce compensated samples. Note that any form of binary arithmetic may used to perform the scaling such as multiplication or division or normalization. The scaling operation can be thought of as amplifying or attenuating the baseband signal to the desired voltage range (i.e, $V_A$ of FIG. 7) in the digital domain. In the preferred embodiment, the FMDCF is applied by multiplying each sample by the FMDCF which is a real number. If the FMDCF is less than 1.0 the digitized samples are attenuated (i.e., scaled down) and if the FMDCF is greater than 1.0 the digitized samples are amplified (i.e., scaled up).

The compensated digital samples are then decoded using standard decode functions as shown in the decoder 419 of FIG. 4. The Symbol Clock 421 and Rx Acquire & Steady State 423 work together to synchronize the device's symbol clock with the base station's (transmitter's) symbol clock. The DC Estimator 425 tracks the received signal and provides the average dc bias level over time. The detector 429 outputs the digital data which is then processed to remove any transmission errors and the forward error correction encoding and framing information that was added for wireless transmission. The data, if addressed to the host device is then provide to the host device by the microprocessor. Note the microprocessor or DSP extracts the base station identifier and determines whether the message is addressed to the wireless modem or associated host device. The data is then provided to the host device by the microprocessor.

As shown in FIG. 4, while the FMDCF is applied to each sample the FM Deviation Adjustment control (FMDAC) function 445 continuously monitors the sample stream to determine the MAX and MIN of the sample values (i.e., $V_{MAX}$ and $V_{MIN}$) over some period of time and adjusts the FMDCF, accordingly. The FMDAC function 445 measures the MAX and MIN values over a plurality of samples and determines what type of adjustment, if any, is needed to the FMDCF. A control algorithm is used to determine the amount of adjustment such as Least Mean Square. Typically the adjustment is proportional to the difference between the current$_{MAX}$ and current$_{MIN}$ values and a desired or expected MAX and MIN values (i.e., expected$_{MAX}$ and expected$_{MIN}$).

In the absence of other information the wireless modem starts receiving messages with a factory determined FMDCF or a default value such as 1.0. This factory determined FMDCF may be used when the modem is first turned on and other FMDCF information has not yet been established. As the wireless modem processes a message it may update or adjust the FMDCF. After processing a message, the adjusted FMDCF and base station identifier from the message are used to construct or update the FM deviation table. A sample FM deviation Table is shown in FIG. 10. When the wireless modem is in an active listening mode, the modem receives many messages which are not addressed to the particular modem or associated host device. However, the modem receives these messages from a base station and can use the messages to determine an appropriate FMDCF for the base station. Thus, after processing a message the wireless modems reads the resulting adjusted FMDCF from the DSP and from the message gets the base identifier and updates the FMDF Table with the extracted base identifier and adjusted FMDCF tuple. If the extracted base station identifier is the expected base station identifier then nothing further is done. If however, the base identifier is not the expected base station identifier then the current or resulting FMDCF in the DSP is updated or reset with a value obtained from the FMDF table entry associated with the expected base identifier. This assures that the FMDCF is always set to compensate for the FM deviation level required for messages from the expected base station. The FMDC function assumes that the next message is destined for the wireless modem, or associated host device, from the expected base station and therefore the FMDCF is set close to or at the level needed to provide FM deviation compensation with little or no adjustment so that no data is lost even at the beginning of the message. Note that as the DSP processes a message from other than the expected base station, the FM deviation adjustment control function attempts to determine the best FMDCF for that base station from the starting FMDCF (the FMDCF associated with the expected base station). Thus, there is the need to reset the FMDCF after tracking the FM deviation from other than the expected base station or from an undeterminable base station (i.e., from a garbled message).

When the base station identifier of a received message is extracted by the microprocessor or DSP, the current FMDCF is obtained (i.e., the microprocessor can query the DSP) and the base station identifier and current FMDCF pair or tuple is stored or updated in the FM deviation table. Thus, while the modem is active the FM Deviation table is updated using messages that the wireless modem can hear. Since the wireless modem has a reasonable good idea of which base station it would receive a message from, it starts with a FMDCF value associated with the expected base station when it starts to receive all messages. If the message is from other then the expected base station the FMDAC function will cause the FMDCF to change to track or adapt to the value needed to receive messages from the other base station at the proper level. Thus, the present invention uses messages to determine the FMDCFs for base stations within listening range of its particular site.

The default FMDCF used in the DSP may also be changed if the expected base station changes. For instance as a mobile computer containing the wireless modem moves the expected base station can change. A table entry will have been created for the next expected base station and the DSP would thus begin to use the value associated with the new expected base identifier as the reset FMDCF value. Thus, when the wireless modem determines that another base station becomes the expected base station from which the modem will likely receive messages the FMDCF is updated in the DSP from the FMDF table. The modem tracks the base station ID for each message it receives and continuously updates its database (regardless of whether the message is addressed to the modem or associated host device).

Figure 9:
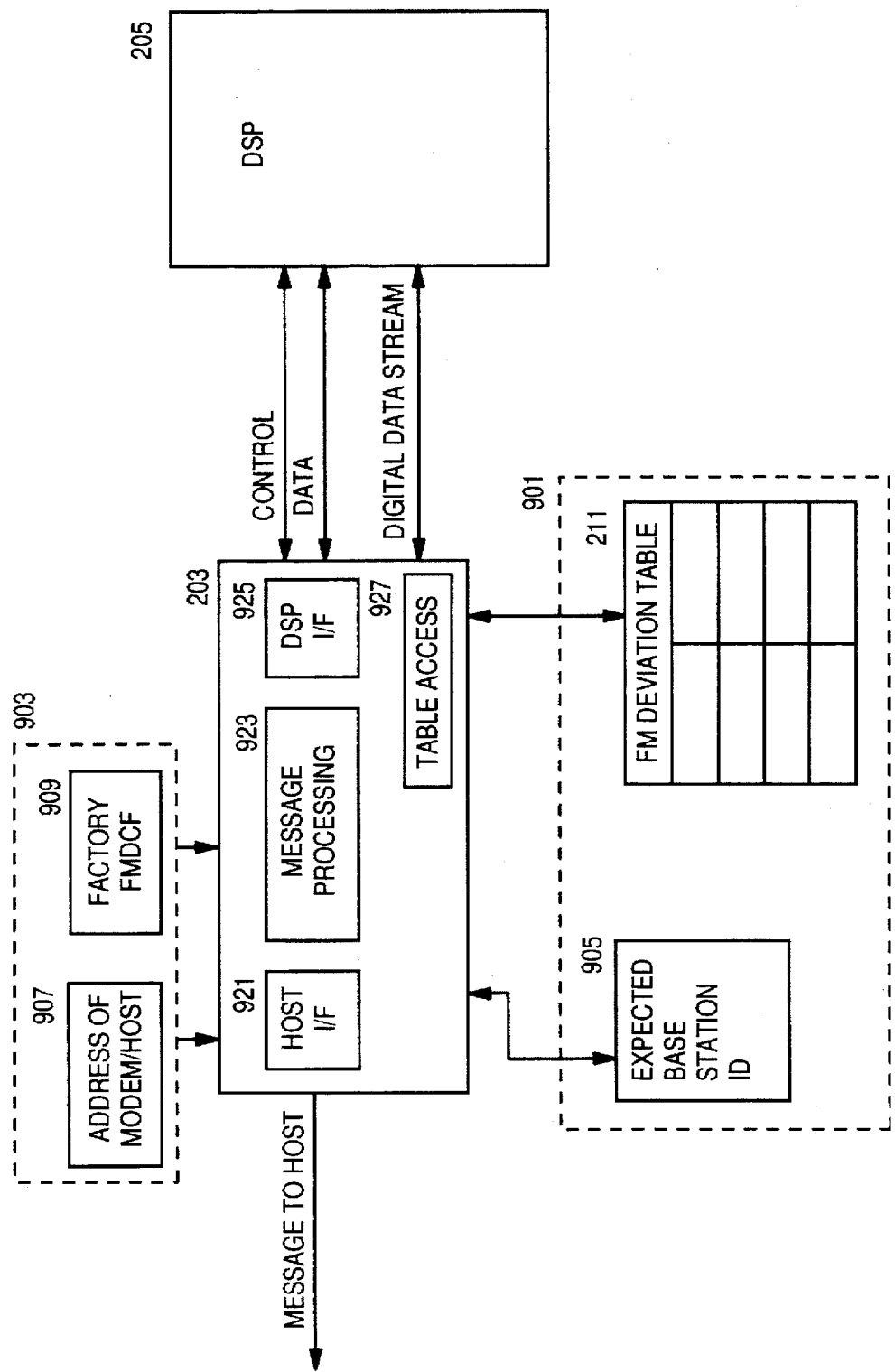
FIG. 9 depicts data stream processing in the microprocessor.

FIG. 9 depicts a more detailed look at the functions carried out by the microprocessor in accordance with the preferred embodiment of the present invention. Note that functions of the microprocessor and DSP are sequences of instructions for operating each accordingly. A digital data stream is provided to the microprocessor from the DSP. The digital data stream may be formatted by the DSP or the microprocessor. Information from the formatted message is extracted by the microprocessor and stored in memory. For instance, a value associated with the expected base station identifier is stored in volatile memory 901. The microprocessor upon extracting a base station identifier queries or causes the DSP to provide the current FMDCF value. The microprocessor then updates the FM deviation table 211 in volatile memory 901 abase station identifier is not the expected base station identifier is not the expected base station identifier then the microprocessor retrieves the FMDCF value (or the factory determined FMDCF value from non-volatile memory if there is no associated table entry) associated with the expected base station identifier and provides this value to the DSP overwriting or resetting the current value. The microprocessor may also reset other parameters used by the FMDAC function to speed adjustment with the reset value. The microprocessor may also extract the message address and compare the message address to the address of the modem or host device 907 which is stored in memory 903. If a match is found then the message is provided to the host via the PCMCIA interface. The microprocessor communicates with the DSP through either a serial port connection, a parallel memory mapped interface, or both. Depending upon the implementation, both control information, such as the FMDCF value, and message data may be written to and read from the DSP over either the serial port connection or parallel memory mapped interface. In the serial case, header information can be used to identify the type of control or message data. In the parallel case, the memory address usually identifies the control or data message type.

Figure 8:
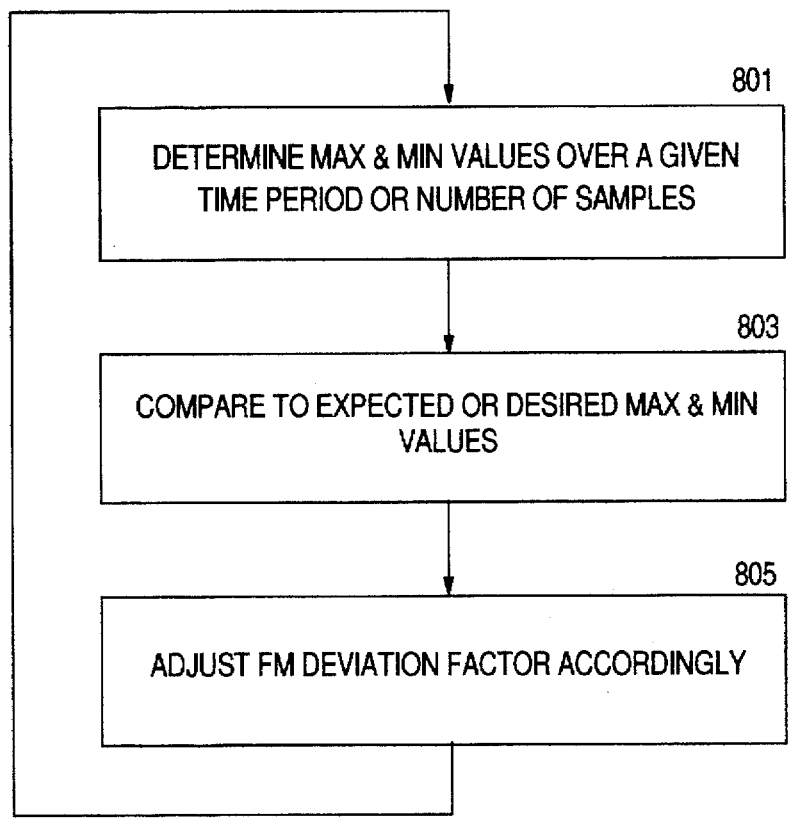
FIG. 8 is a simple FM deviation control algorithm.

FIG. 8 depicts a very simple FM deviation adjustment control algorithm for determining the FMDCF value or an adjustment to the FMDCF value. The process is typically started with a default or seed FMDCF value (i.e., the factory determined value or the value associated with the expected base station identifier). The default FMDCF is usually determined in the factory where the wireless modem is produced as part of final testing and assembly. The FM deviation adjustment control function monitors the sample stream and over a plurality of samples determines a current-$_{MAX}$ value and current$_{MIN}$ value for the plurality of samples. This is shown in step 801. The determined current range (i.e., current$_{MAX}$ and current$_{MIN}$) is compared to a desired or expected range (i.e., expected$_{MAX}$ and expected$_{MIN}$). This is shown in step 803. If the desired range is different (or different enough) the FMDCF is adjusted in step 805. The adjustment may consider the current FMDCF value, previously determined ranges (i.e., current$_{MAX-1}$ and current$_{MIN-1}$) and derivatives thereof. The actual computation will depend on the particular algorithm being utilized. The adjusted FMDCF is used to process samples in the stream and the adjustment process continues with newly received samples. Samples are monitored as they are received from the A/D converter. However, in an alternative embodiment the compensated samples may be monitored.

Each time the wireless modem is activated in a geographically area it may start up with a FM deviation table that was previous stored in non-volatile memory or may start by using only the factory determined FMDCF.

Figure 6:
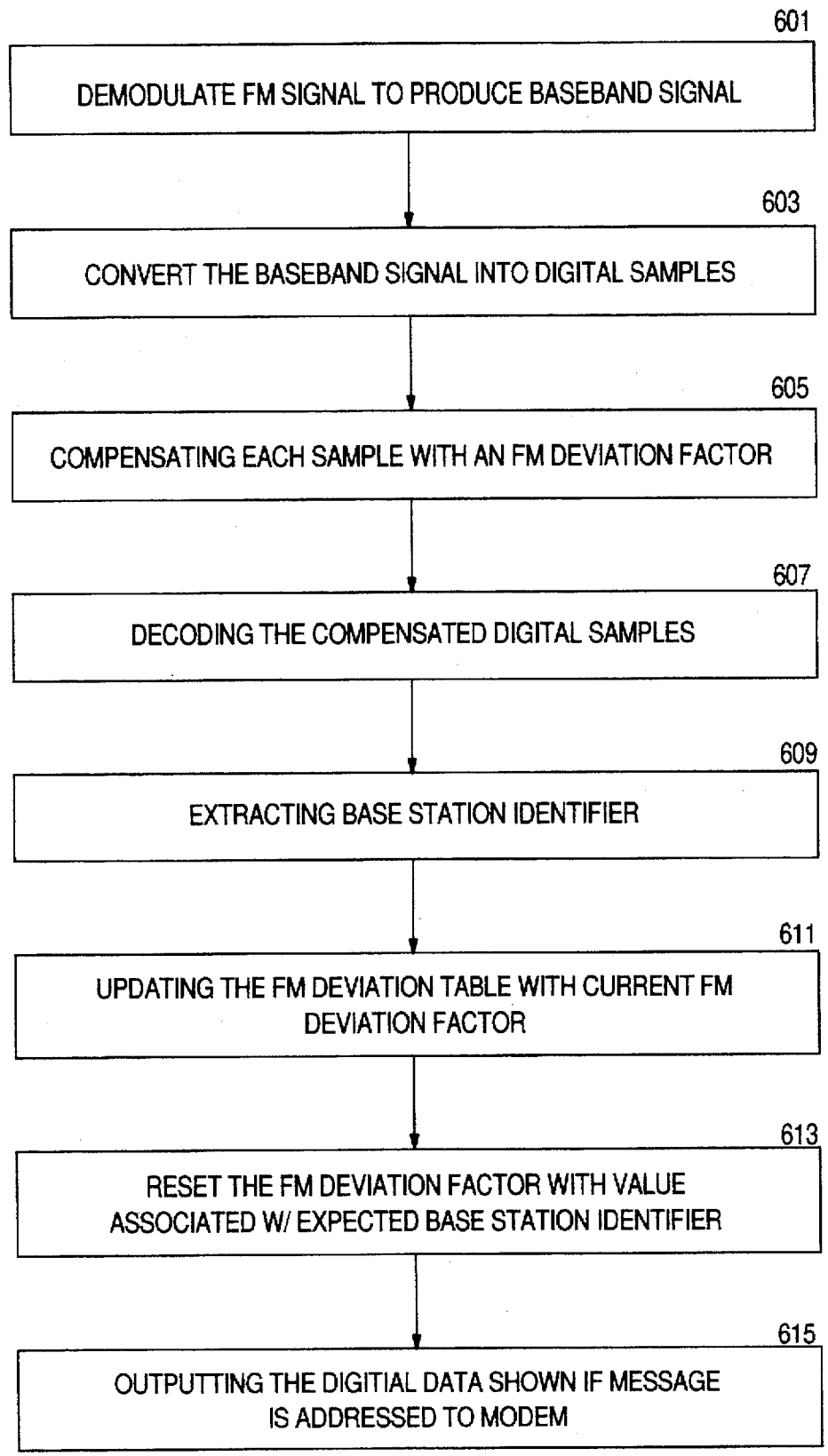
FIG. 6 depicts a method of receiving FM signals in accordance with the present invention.

A method of receiving and processing an FM signal is shown in FIG. 6. An FM signal is demodulated to produce a baseband signal in step 601. In step 603, the baseband signal is digitized or converted into one or more digital samples. In step 605, each digital sample is adjusted by a FM deviation factor. And in step 607 the compensated digital sample stream is decoded to output a digital data stream. In step 609 base station identifier information is extracted from the incoming stream. In step 611 the FM deviation factor table is updated using the extracted base station identifier and the current FMDCF obtained from the DSP. In step 613 when the present base station keys down the current FMDCF in use in the DSP is updated, if the extracted base identifier does not equal the expected base station identifier. The updated value for the current FMDCF is obtained from the FM deviation table. In step 615, the message is output if addressed to the modem or host device address. Note that while the stream of samples are processed as described in FIG. 6 above the FM Deviation Adjustment Control is also being carried out in parallel. Thus, the FMDCF applied to the initial samples may differ from the FMDCF applied to samples later in the stream.

In the preferred embodiment the wireless modem can also transmit data. As shown in FIG. 4, data for transmission by the wireless modem is provided from the microprocessor to the encoder 400. The encoder as shown in FIG. 4 includes framing 401 which causes a header and cyclical redundancy codes (CRC) to be added to the data. Fixed patterns such as symbol sync and frame sync may be added to help with decoding at the receiver. Channel status data may also be embedded in the data. Forward error correction 403 (such as Reed Solomon) may be utilized or other error detection and/or correction information may be added to the data/symbol stream. Trellis or convolution coding or other coding schemes may be utilized depending on the desired communication protocol. A digital filter 405 is applied to the data/symbol stream to produced desired waveform shaping. The digital samples, which may be any bit length but, are typically 8 or 16 bits in length. The digital samples are provided to a D/A converter 411. The digital samples are then converted to an analog baseband signal. The baseband signal is then modulated by the transmitter using the local oscillator signal to produce the FM signal at the desired carrier frequency which is radiated by the antenna.

A method of transmitting an FM signal is also described in which data to be transmitted is inputted to the modem. The data is then encoded to produce signal samples. Each sample is converted to an analog baseband signal. The analog baseband signal is then used to modulate a local oscillator signal and the FM signal is transmitted.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. A radio data modem comprising:
   a receiver for demodulating an FM signal received from an antenna, said receiver producing an analog baseband signal;
   an analog to digital converter for converting the analog baseband signal into a stream of digital samples;
   a compensator for scaling each sample by a deviation compensation factor;
   an adjustment means for monitoring the sample stream and continuously adjusting the deviation compensation factor;
   a decoder for decoding the compensated sample stream into a digital data stream;
   an update means for extracting a base station identifier from the digital data stream and storing the base station identifier with the adjusted deviation compensation factor in a deviation table, said update means determining whether the extracted base station identifier is representative of an expected base station and if not updating the deviation compensation factor used by the compensator with a value associated with the expected base station identifier in the deviation table.

2. The radio modem of claim 1 wherein decoder further comprises:
   a symbol clock acquisition means,
   a filter,
   a detector,
   a means for removing forward error correction; and,
   a means for removing framing information.

3. The radio modem of claim 1 wherein adjustment means uses a least means square algorithm to adjust the deviation compensation factor.

4. The radio modem of claim 2 wherein the adjustment means uses a least means square algorithm to adjust the deviation compensation factor.

5. The radio modem of claim 1 wherein a microprocessor provides an interface from the radio modem to an external device.

6. The radio modem of claim 1 further comprising a connector and an interface logic providing a Personal Computer Manufacture Personal Computer Memory Card International Association (PCMCIA) compliant interface to the radio modem.

7. The radio modem of claim 1 further comprising:
   a encoder which inputs a transmit digital input stream, encodes the transmit digital input stream to produce a stream of transmit digital samples, converts the stream of digital samples to a transmit analog baseband signal;
   a transmitter for modulating a transmit local oscillator frequency with the transmit analog baseband signal to provide a transmit FM signal which is radiated by an antenna.

8. The radio modem of claim 7 wherein the antenna is multiplexed between the receiver and the transmitter by a duplexor.

9. The radio modem of claim 1 wherein the compensator, adjustment means, decoder and update means are implemented in a digital signal processor.

10. The radio modem of claim 9 wherein the analog to digital converter is implemented in the digital signal processor.

11. A method compensating for FM deviation error in a FM radio modem comprising the steps of:
    demodulating a received FM signal to produce an analog base band signal;
    converting the baseband signal into a plurality of samples;
    scaling each sample by a FM deviation factor;
    updating the FM deviation factor in accordance with a control algorithm and a plurality of samples;
    decoding the scaled digital samples to provide a digital data stream;
    extracting a base station identifier from the digital data stream;
    updating a FM deviation table using the extracted base station identifier and the updated FM deviation factor;
    resetting the FM deviation factor if the extracted base station identifier is different than an expected base station identifier, the FM deviation factor being reset to a value obtained from the FM deviation table that is associated with the expected base station identifier.

12. The method of claim 11 further comprising the step of:
    outputting the digital data stream if the digital data stream is addressed to the FM radio modem.

13. The method of claim 12 wherein if the FM deviation factor is updated the control algorithm is reset.

14. An article of manufacture comprising a modem useable medium having a modem readable program embodied in said medium, wherein the modem readable program when executed in a modem causes the modem to:
    demodulate a received FM signal to produce an analog base band signal;
    convert the analog baseband signal into a plurality of samples;
    scale each sample by a FM deviation factor;
    update the FM deviation factor in accordance with a control algorithm and one or more samples;
    decode the scaled digital samples to provide a digital data stream;
    extract a base station identifier from the digital data stream;
    update a FM deviation table using the extracted base station identifier and the updated FM deviation factor;
    reset the FM deviation factor if the extracted base station identifier is different than an expected base station identifier, the FM deviation factor being reset to a value obtained from the FM deviation table that is associated with the expected base station identifier.

15. The article of manufacture of claim 14 wherein said computer readable program when executed a modem further causes the modem to:
    output the digital data stream if the digital data stream contains address matching a stored address.

16. The article of manufacture of claim 15 wherein said computer readable program when executed a modem further causes the modem to:
    encode a transmit digital data stream to produce a stream of encoded data samples;
    convert said encoded data samples to an analog transmit baseband signal; and
    frequency modulate a carrier with the analog transmit baseband signal.

17. A radio data modem comprising:
    an antenna coupled to a duplexor, said duplexor permitting the antenna to be shared between a transmitter and a receiver;

the receiver coupled to the duplexor for receiving FM signals and demodulating the received FM signals to produce a baseband signal;

the transmitter coupled to the duplexor for transmitting a FM signal, said transmitter modulating a transmit carrier with a transmit baseband signal to produce a transmitted FM signal;

a digital signal processor coupled to the receiver and the transmitter, wherein the digital signal processor converts the received analog baseband signal into a first stream of digital samples, compensates each of the samples of the first stream with a deviation compensation value, decoding the compensated first digital sample stream to produce a received digital data stream, adjusts the deviation compensation value based on a plurality samples of the first stream; and wherein the digital signal processor receives a transmit digital input stream, encodes the transmit digital input stream to produce a second stream of digital samples, converts said compensated second stream of digital samples to the transmit analog baseband signal; and, a microprocessor coupled to the digital signal processor, the microprocessor extracting a base station identifier from the digital data stream updating a FM deviation table using the extracted base station identifier and the adjusted deviation compensation factor, the microprocessor causing the digital signal processor to reset the deviation compensation factor if the extracted base station identifier is different than an expected base station identifier, the deviation compensation factor being reset to a value obtained from the deviation table that is associated with the expected base station identifier.

18. The radio modem of claim 17 wherein modem is Personal Computer Manufacture Personal Computer Memory Card International Association (PCMCIA) compatible.

19. The radio modem of claim 18 wherein the transmitter, the receiver, and the antenna are located externally from a Personal Computer Manufacture Personal Computer Memory Card International Association (PCMCIA) compliant card containing the digital signal processor and microprocessor.

* * * * *